United States Patent [19]

Chauvin

[11] Patent Number: 4,778,686
[45] Date of Patent: Oct. 18, 1988

[54] METHOD FOR MANUFACTURING TOROID SHAPED FOOD PRODUCTS

[75] Inventor: Bernard L. Chauvin, Bauge, France
[73] Assignee: Soparind, Paris, France
[21] Appl. No.: 132,684
[22] Filed: Dec. 14, 1987

Related U.S. Application Data

[63] Continuation of Ser. No. 797,542, Nov. 13, 1985, abandoned.

[30] Foreign Application Priority Data

Nov. 13, 1984 [FR] France .................. 84 17253

[51] Int. Cl.⁴ ............................................. A22C 11/00
[52] U.S. Cl. ..................................... 426/412; 53/409; 53/469; 426/413
[58] Field of Search ............... 426/105, 129, 135, 138, 426/140, 284, 143, 513, 412, 413; 53/409, 469

[56] References Cited

U.S. PATENT DOCUMENTS

3,180,737  4/1965  Culp .................... 426/513 X
3,857,330 12/1974  Ruckstaetter ........... 426/143 X
4,410,011 10/1983  Andra et al. ........... 426/135 X

Primary Examiner—Arthur L. Corbin
Attorney, Agent, or Firm—Kenyon & Kenyon

[57] ABSTRACT

The invention relates to a process for manufacturing a sausage type food product. It comprises an initial phase in which a tubular envelope, more particularly a natural or artificial casing, is filled with edible contents, more particularly a minced meat based composition, and a final phase in which one or more treatments are performed, more particularly steaming, drying, smoking or cooking, and before the final phase the edible contents are formed into a ring which is closed on itself.

10 Claims, 6 Drawing Sheets

METHOD FOR MANUFACTURING TOROID SHAPED FOOD PRODUCTS

This application is a continuation of application Ser. No. 797,542, filed Nov. 13, 1985, now abandoned.

BACKGROUND OF THE INVENTION

The invention relates to a process and plant for manufacturing a sausage or salami type food product and the food product thus obtained.

Today a number of different sausages and salamis are known (such as steamed and/or smoked cooking sausages, roasting sausages, sausages for spreading, raw sausages, dried or semi-dried sausages, cooked salamis, dried salamis etc., with or without casing). The said sausages may be any one of the following shapes: rectilinear, curved: annular or horse shoe or hairpin shaped, the two ends of the sausage which are set apart from one another to a greater or lesser degree being interconnected by means of two staples or end or closing connections of the sausage associated together directly or indirectly by means of an additional connection (Swiss Pat. No. 538811). They can also be an open ring (U.S. Pat. No. 3,180,737), round, oval, elliptical disc shaped or flat or rectangular parallelepiped (German Pat. No. 2406090 and French Pat. No. 2379985). These sausages are manufactured according to either one of the following processes: by being stuffed into a tube the front end of which has been sealed previously and the rear end of which is sealed after filling the tubular envelope with the edible contents (Swiss Pat. No. 538811, French Pat. No. 2214635, German Pat. No. 2937761): shaping is provided by a mould which corresponds to the required shape of the end product (French Pat. No. 2379985 and German Pat. No. 2406090).

There are also a number of different modifications of filler casing or tubular envelope with regard to type (natural or synthetic), their manufacturing process, properties (e.g. their adhesive power) and, finally, their shape. More particularly, a process is known which provides the thermoplastic resin casing with a curved shape (French Pat. No. 2343576).

Methods for storing delicatessen (such as black pudding or saucisse de Toulouse) are known which consist in being rolled into a spiral, possibly on a conical prong provided for this purpose (German Pat. No. 2937761).

U.S. Pat. No. 3,180,737 discloses a sausage cooked in its skin in the shape of an open ring. The raw meat emulsion is firstly stuffed inside an elongate tubular envelope, then the envelope, which is coated with the meat emulsion and which is deformable, is wound into a spiral on a prong, the meat is then heated and cooked until the sausage retains its helicoidal shape. The prong is then removed and the sausage is cut longitudinally along the prong in order to separate each turn of the spiral. The envelope in which the sausage is cooked is removed to leave a skinless sausage.

German Pat. No. 2406090 discloses a flat cooking sausage which is in the shape of an elliptical disc, surrounded by a skin. The sausage meat is then moulded, pressed and shaped in a disc-shaped mould then heated, being skinless up to that moment. The skin, which is made from a coagulable substance such as sodium alginate, is applied to the sausage meat by pulverisation or immersion.

French Pat. No. 2379985 discloses a delicatessen product in the shape of a round or oval disc or a flat or rectangular parallelepiped. A sheet of the cellophane envelope is placed at the bottom of a mould, then sausage paste is pressed into the mould and the envelope is closed about the paste. The pre-moulded paste is disposed on a tray, steamed and then dried. The original envelope, which because of its type does not stick to the edible contents, is then removed. The paste, thus steamed, is then dried and the envelope removed in a vat of edible gelatine, and then preferably covered with spices. The object of this patent, therefore, is to manufacture a salami type product which differs completely from the traditional shape.

SUMMARY OF THE INVENTION

The aim of the invention is to solve the problem facing the consumer, which is the presence of the ends of the outside slice and stub as well as corresponding sealing means (string, staple, etc.), in the case of a sausage or salami-type food product (in particular dried, semi-dried or smoked), comprising casing, which is natural, stuck together, reconstituted or synthetic, the slices of the product all having identical or similar circular or approximately circular contours.

To this end, the invention relates to a process for manufacturing a sausage or salami-type food product comprising a tubular envelope, in particular a casing which is natural, stuck together, reconstituted or synthetic, and edible contents in particular with a minced meat base, comprising an initial first phase in which the tubular envelope is filled with the edible contents in paste form and a second and final treatment phase in which at least one treatment of the edible contents is carried out in its tubular envelope, in particular steaming and drying, in order to bring the food product to its final state where it has a certain form. Before the second and final phase of treatment, the tubular envelope and the edible product are shaped into a ring which is completely closed on itself in a continuous manner. After the second phase the tubular envelope is retained as it comprises the skin of the finished product. The physical treatment is preferably steaming or drying, but also optionally cooking. The food product is actually held in the shape of a closed ring until the treatment in the second phase has set the ring shape.

Preferably, the tubular envelope is filled with edible contents by stuffing and before the second treatment phase the tubular envelope and the edible contents made to curve until the two free end portions are in contact with one another and form an extension of one another.

The invention also relates to a plant for carrying out the process which comprises a first station for filling a tubular envelope and a second station for treatment (more particularly steaming, drying). The plant comprises curving means for the tubular envelope and the edible contents, having the function of bringing the two opposite free end portions into contact with one another so as to form the extension of one another in order to give the food product the shape of a ring closed on itself in a continuous manner.

The invention thus relates to a sausage or salami type food product comprising a tubular envelope made of a casing which is natural, stuck together, reconstituted, synthetic, and edible contents, more particularly with a minced meat base. The food product has the shape of a ring which is closed on itself in a continuous manner and thus has no end and no end slice or stub or sealing means such as staples or string. These characteristics are, preferably, those of a dried or semi-dried sausage or salami type food product comprising a skin consisting of a casing. The aim of the invention is thus to achieve the original and advantageous ring shape for a traditional product which, in respect of its composition, does not allow for this shape to be obtained.

These are original characteristics with regard to the state of the art: rectilinear or curved sausages according to Swiss Pat. No. 538811 comprise two ends and therefore an end slice and a stub. Further, the salami comprises staples or string. The sausage according to U.S. Pat. No. 3,180,737 is an open ring, not a closed one. It therefore has two ends which comprise an end slice or a stub. The sausage concerned is cooked and not dried. The sausage according to German Pat. No. 2406090 is disc-shaped and not annular. It is cooked and not dried. It is moulded and not manufactured by stuffing. The skin is a coagulable substance and not a casing with all the advantages which that provides. The delicatessen product according to French Pat. No. 2379985 is disc-shaped and not annular and is made using a mould. For production it is placed in a disposable cellophane envelope and the manufacturing process comprises a final moistening stage in a gelatine bath to provide a coating layer on which spices are placed, which is not the case in the invention.

BRIEF DESCRIPTION OF THE DRAWINGS

Other characteristics of the invention will become apparent from the specification which follows, with reference to the accompanying drawings, in which:

FIG. 1b is a diagrammatic view of a cross-section of the food product shown in FIG. 1a.

DESCRIPTION OF THE PREFERRED EMBODIMENT

The invention relates to a process for manufacturing a sausage or salami type food product comprising a tubular envelope 2 and edible contents 3. Preferably, the tubular envelope 2 is a casing which is natural or stuck together, reconstituted or synthetic, and the edible contents 2 a minced meat base such as sausage meat. However, the invention applies to different types of edible contents, such as cheese, which can be treated in a similar way.

The process comprises, in a manner known per se, an initial first phase in which the tubular envelope 2 is filled with the edible contents 3 in the paste state and a second and final phase of treatment in which there is at least one treatment of the edible contents 3 in a tubular envelope 2, more particularly and preferably steaming and drying (possibly also cooking) in order for the food product 1 to reach its definitive stage where it has particular characteristics.

According to the invention, before the second and final phase of the treatment, the envelope 2 and the edible contents 3 are made to form a ring which is closed completely on itself in a continuous manner, being without an end slice or stub.

During the second and final phase of treatment, the tubular envelope 2 and the edible contents 3 are kept in the shape of a ring until the second and final phase treatment has set the ring shape which then becomes the final shape of the food product 1, having particular characteristics per se.

After the second phase of the treatment, the tubular envelope 2 which comprises the skin of the food product 1 is retained. Because of its type, the said skin adheres closely to the edible contents 3 and has excellent qualities, in particular with regard to preservation, protection and display. In principle, the second phase is the last and is not followed by a stage for peeling off the tubular envelope 2 used in the manufacture of the food product 1. However, it may be followed by a coating stage in a display or savoury product, or a finishing or packing stage. However, this possible additional stage has no effect on the actual manufacture of the food product 1 nor on the food product 1 itself.

From the moment that the tubular envelope 2 and the edible contents 3 have been formed into a ring, as mentioned above, and until the ring shape has set, on account of the second phase treatment, the food product 1 is kept, transported and stored preferably horizontally flat.

Figure 5A:
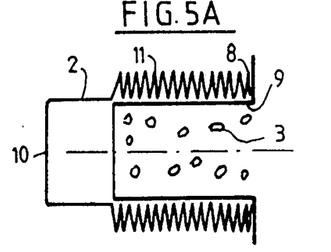
FIGS. 5a, 5b, 5c, 5d, 5e, 5f, 5g and 5h are eight diagrammatic views illustrating a first preferred embodiment of a food product according to the invention, by stuffing.
Figure 5B:
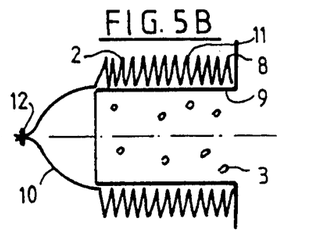
Figures 5C, 5D, 5E:
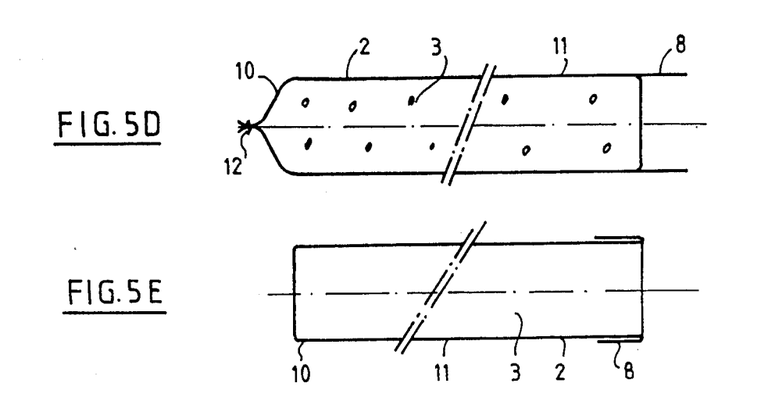
Figure 5F:
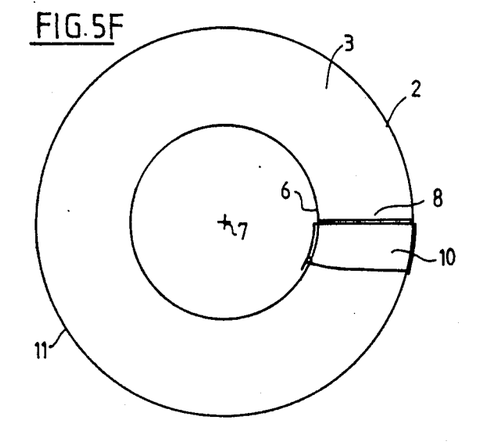
Figure 5G:
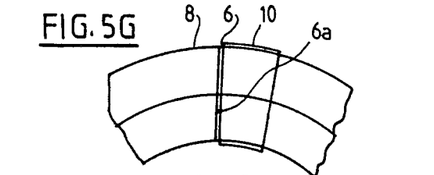
Figures 5H, 7:
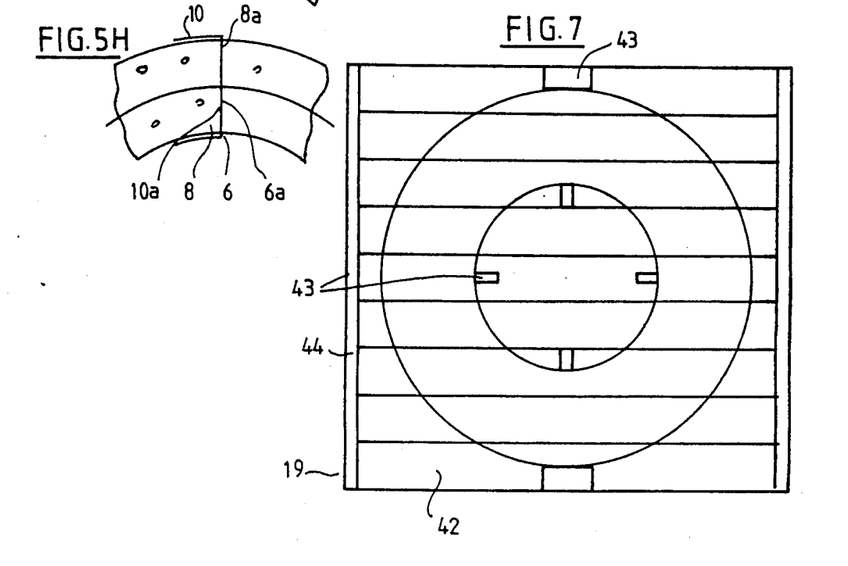
FIGS. 7 and 8 are two views, respectively one plan view and the other a section view, along line 8—8 of FIG. 7, illustrating means for holding the food product according to the invention.
Figure 6A:
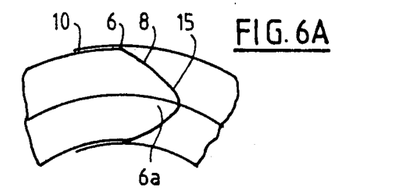
FIGS. 6a, 6b, and 6c are three diagramatic views in section through an axial plane which show three possibilities for the first preferred embodiment.
Figure 6B:
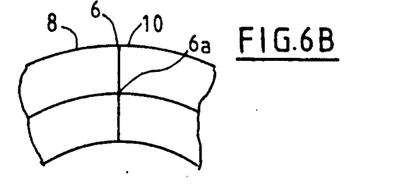
Figure 6C:
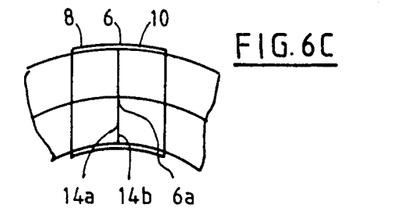

Reference is now made to FIGS. 5 and 6 which illustrate a preferred embodiment of the invention. A tubular envelope 2, such as intestine, is filled with the edible contents 3 by stuffing and before the second and final phase of treatment the tubular envelope 2 and the edible contents 3 are curved so that the two rear 8a and front 10a parts of the edible contents 3 can be brought into contact with one another, so that there is continuity between the two free end portions 14a, 14b of the food product 1 to form an extension of one another. In a manner known per se, the process according to this preferred modification comprises a first stage (FIG. 5a) where the tubular envelope 2 is attached by its free rear end portion 8 to a joining piece or fixing member 9. The free front end portion 10 of the tubular envelope 2 is open at this stage of the process. The middle part 11 of the tubular envelope 2 is folded on the joining piece 9 so that there is minimum axial clearance.

In a second stage, also known per se (FIG. 5b), the free front end portion 10 of the tubular envelope 2 is closed by means of a staple or knot 12 or by other means, such as mechanical or finger pinching.

In a third stage, also known per se (FIG. 5c), the edible content 3 is fed in via the joining piece 9 while the free front end portion 10 is gradually distanced from the joining piece 9 and the middle part 11 unfolded.

This third stage is preferably performed while the tubular envelope 2 is not completely filled, its free rear end portion 8 remaining empty or at least only partly empty, which corresponds to the fourth stage (FIG. 5d).

According to the invention, during curving, the tubular envelope 2 is open at its front end 10. For this purpose, in a first possible embodiment, the free front end 10 or the tubular envelope 2 is closed in the second stage (FIG. 5b) as above, i.e. before filling with the edible contents 3. Then, after filling, the free front end portion 10 is opened, by a transverse cut in the first part of the fifth stage (FIG. 5e). The said transverse cut allows for a front end straight transverse section which is identical to all other straight transverse sections of the food product and in particular that of the other rear end. The edible contents of the front end can be recycled, thereby avoiding waste.

In a second possible embodiment the tubular envelope 2 is filled with the edible contents 3 without closing the free front end portion 10 of the tubular envelope 2, and the filling is regulated, i.e. the speed of the edible contents through the fixing member 9 and the linear entrainment speed of free front end portion 10 so that the tubular envelope 2 is filled with the edible contents 3, although the free front end portion 10 of the tubular envelope 2 remains open. Excess edible contents 3 are also recycled. This embodiment does not, therefore, comprise the transverse cut of the first part of the above-mentioned fifth stage in the first embodiment.

Consequently, the free front end portion 10 of the tubular envelope 2 is that which is represented on the left in FIG. 5e and which results from the first or second embodiment described above.

According to the invention, during curving, the tubular envelope 2 is also open at its free rear end portion 8. In the second part of the fifth stage (FIG. 5e), the free rear end portion 8, which is empty or at least only partly filled with edible contents 3, is turned back on itself outwards, so as to be pressed against the outer face of the envelope 2. The free rear end portion 8 which is turned back in this way is kept in reserve for use at a later stage, the edible contents 3 extending as far as the annular fold which the tubular envelope 2 forms, the front and rear end transverse straight sections, therefore, being identical or substantially identical.

The sixth stage is the curving of the tubular envelope 2 and of the edible contents 3 (FIG. 5f). The curving allows for the two rear 8a and front 10a end portions of the edible contents 3 to be brought in to contact with one another.

Until this sixth stage of the process, the edible contents 3 are in a paste state and are plastically deformable. The curving thus naturally gives the tubular envelope 2 and the edible contents 3 a generally annular shape.

As the two free ends 14a, 14b of the food product are identical and are brought into contact, the two free end portions 8, 8a, 10, 10a of the tubular envelope 2 and the edible contents 3 form the extension of one another, allowing for the ring to be closed in a continuous manner (FIG. 5g).

One of the free end portions of the envelope 2 is used to cover at least one part of the other free end portion. Then, in the seventh stage at the end of the curving process (FIG. 5h) the free rear end portion 8 which has been drawn back previously is drawn back from the outside, so that it covers the free front end portion 10.

According to a first possible embodiment (6a), one of free end portions (8, 8a) is made to penetrate the other free end portion (10, 10a), preferably in the case where the free front end portion has, in straight transverse section, a different shape from that of the rest of the product, for example because it has not been cut or has been cut inadequately. Thus, a residue 15 of the tubular envelope 2, corresponding to the free front end portion 10, is present in the product in the joining region 6a of the edible product 3. However, this residue 15 might prove to be almost negligible at the end of manufacturing process, in view of the second and final phase of steaming and drying.

In another possible embodiment (FIG. 6b), the tubular envelope 2 is completely filled, including its free rear end portion 8. In this case, the two free end portions 14a, 14b are placed end to end one against the other, without the free end portions 8, 10 of the tubular envelope 2 being covered. In this embodiment, the outer holding means hold efficiently, at least temporarily, the two free end portions 14a, 14b against one another.

In another embodiment (FIG. 6c), a section of the envelope junction 16 is placed in the junction region 6, covering the free end portions 8, 10, which may or may not be covered.

In another embodiment (not shown), the overlapping region of the two free end portions 8, 10 of the envelope 2 is coated with edible adhesive.

According to the invention the second and final phase of treatment, it is, inter alia, also the object of the drying process to bring about intimate mixing of the two free end portions 8a, 8b of the edible contents 3 and reciprocal union of the two free end portions 8, 10 of the tubular envelope 2.

The main advantages of the first embodiment which has just been described are the use of conventional casings and the tried and tested technique of stuffing.

Figure 2:
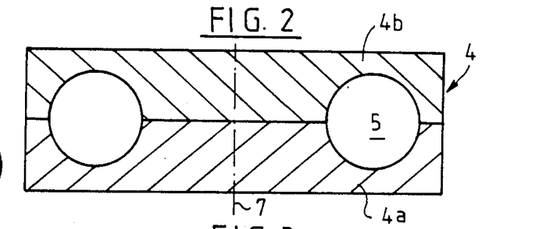
FIG. 2 is a diagrammatic view in section through a transverse plane of a mould for manufacturing a food product according to the invention (second modification).
Figure 3:
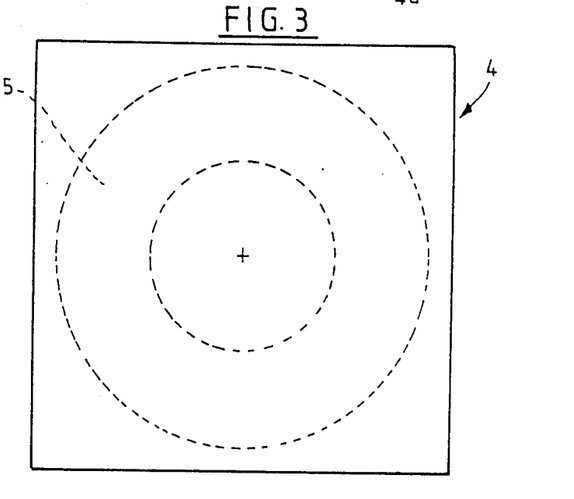
FIG. 3 is a plan view of the mould illustrated in FIG. 2.
Figure 4A:
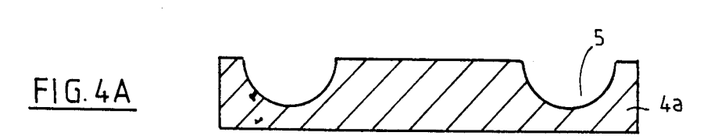
FIGS. 4a, 4b, 4c, 4d, 4e and 4f are six diagrammatic views in section through a transverse plan illustrating a second embodiment for manufacturing a food product according to the invention, by moulding.
Figure 4B:
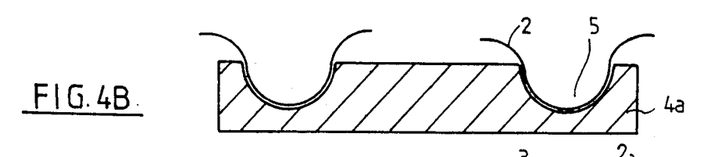
Figure 4C:
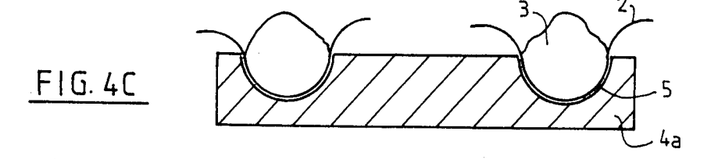
Figure 4D:
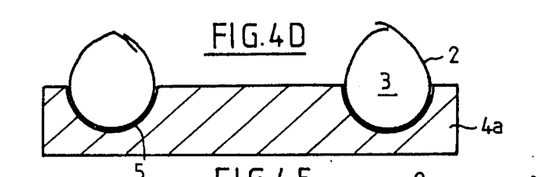
Figure 4E:
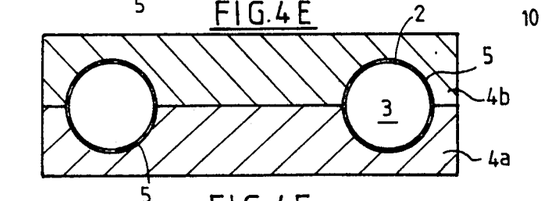
Figure 4F:
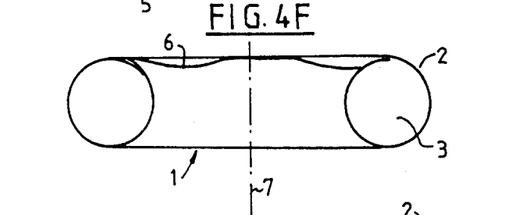

Reference is now made to FIGS. 2 to 4 which illustrate a second embodiment of the invention by means of a mould 4 in two parts 4a, 4b defining a hollow space 5 which, according to the invention, is annular in shape.

In a first stage (FIG. 4a) the two parts 4a, 4b of the mould are separate from one another. In a second stage (FIG. 4b), the envelope 2 which is in the general form of sheets in rings, the dimensions of which allow for the entire inner surface of the hollow space 5 to be covered, is disposed in the hollow space 5 of the part 4a.

In a third stage (FIG. 4c), the edible contents 3 are arranged on the envelope 2, which are disposed in the hollow space of the part 4a in sufficient quantity to fill, at a later stage, the entire hollow space 5 of the two parts 4a, 4b associated with one another.

In the fourth stage (FIG. 4d), the envelope 2 is folded down so as to overlap itself in order to trap the edible contents 3 inside the tubular envelope 2 thus formed.

In a fifth stage (FIG. 4e), the mould 4 is closed by pressing the two parts 4a, 4b against one another so as to give the food product 1 the shape of the hollow space 5, i.e. a closed ring.

In a sixth stage (FIG. 4f) the food product 1 can be removed from the mould. It then has a junction region 6 of the envelope 2 which has a generally circular shape, the axis 7 of which is that of the ring or the annulus which the food product 1 forms. The junction region 6 is invisible, since the two edges of the envelope 2 overlap one another, being perfectly united with one another in the second treatment phase, i.e. drying.

In this second embodiment, by moulding, the second phase of treatment is the final manufacturing phase of the food product, i.e. that it is not necessarily followed by a phase which substantially changes the nature, structure, composition, the shape, or the dimensions of the food product. However, as has already been mentioned above, the treatment phase may be followed by a finishing or packing phase, more particularly a savoury layer or display layer can be applied to the product.

In another embodiment of the second modification, the edible contents 3 are shaped before applying the envelope 2. The stages are therefore as follows: mould filling, shaping the contents 3 into a ring, arranged on the envelope 2, the ring shape being maintained (first phase) and then the treatment: steaming and drying (second phase).

The invention also relates to the sausage or salami type food product 1 comprising a tubular envelope 2 with natural or artificial casing, and edible contents 3 in particular with a minced meat base (but also any product which can be subjected to the same type of treatment, such as steaming drying and possibly cooking, and more particularly cheese base products), as is obtained by using the process which has just been described, mainly in the first modification by stuffing.

According to another characteristic, the tubular envelope 2 and the edible contents 3 form a ring which is closed on itself in a continuous manner (comprising a central hole) and thus without an end slice or stub. In its preferred embodiment, the food product is a dried or semi-dried or smoked sausage or salami which has then undergone a second treatment phase consisting substantially in steaming followed by drying. In a modification, the food product is cooked and the second phase of treatment comprises ccoking.

Figure 14A:
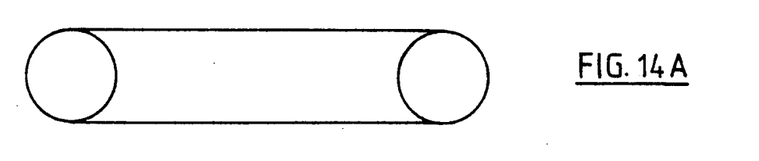
FIGS. 14a, 14b, 14c and 14d are four diagrammatic views through a transverse plane of four embodiments of the food product according to the invention.
Figure 14B:
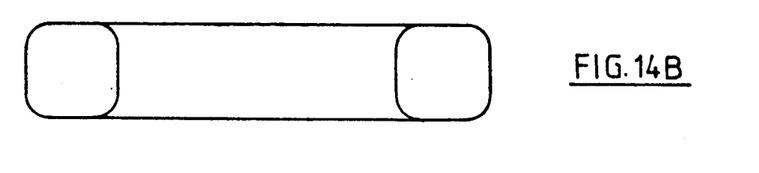
Figure 14C:
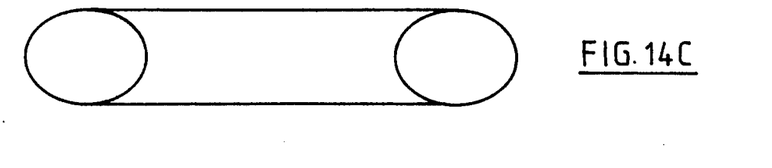
Figure 14D:
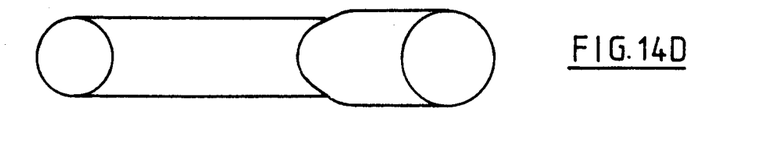

The different straight transverse sections of the food product 1 are substantially identical and have, more particularly, a circular or approximately circular contour (FIG. 14a). In a second modification (FIG. 14b), the contour is approximately square with rounded corners. In a third modification (FIG. 14c) the contour is ellipsoidal. In a fourth modification (FIG. 14d), the contour is circular according to two different successive diameters corresponding to two successive sections of the ring.

Figure 1A:
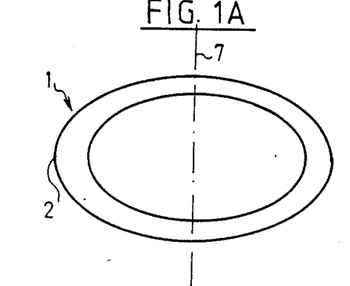
FIG. 1a is a diagrammatic perspective view of a food product according to the invention.
Figure 1B:
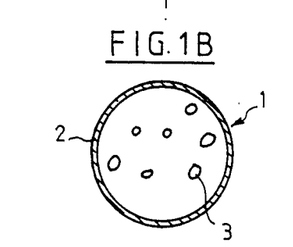

The contour of the ring is preferably circular (FIG. 1a) but may also be polygonal in modification. The dimensions of the food product thus obtained may vary within quite broad limits, more particularly and preferably the diameter of a circular straight transverse section may be between 2 and 6 cm approximately and the average diameter of the ring between approximately 10 cm and 50 cm.

The invention further relates to a plant for carrying out the process and manufacturing the food product 1 as described above.

This plant (FIG. 9) comprises a first station 17 for filling the tubular envelope 2 with the edible contents 3 and a final treatment station more particularly and preferably for steaming and drying (not shown) or, possibly, cooking.

Figure 9:
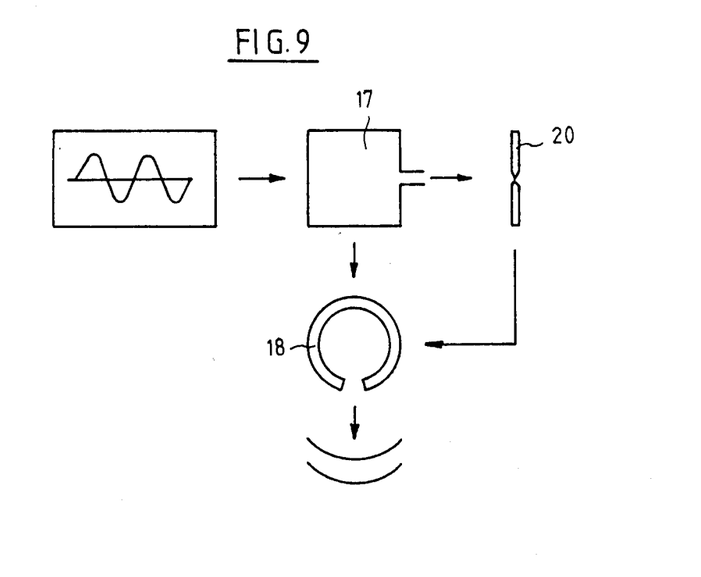
FIG. 9 is a diagrammatic view of a plant for carrying out the process according to the invention.

Between the first and second stations the plant comprises means 18 for curving the tubular envelope 2 and the edible contents 3, the function of which means is to bring their opposite free end portions 14a, 14b into contact with one another, so as to be the extension of one another, in order to give the tubular envelope 2 and the edible contents 3 the shape of a ring which is closed on itself in a continuous manner.

The plant also comprises holding means 19 which are active from when the curving means 18 are in operation until the second treatment station is reached, having the function of positively maintaining the food product so that it retains the shape given to it by the curving means 18.

Figure 8:
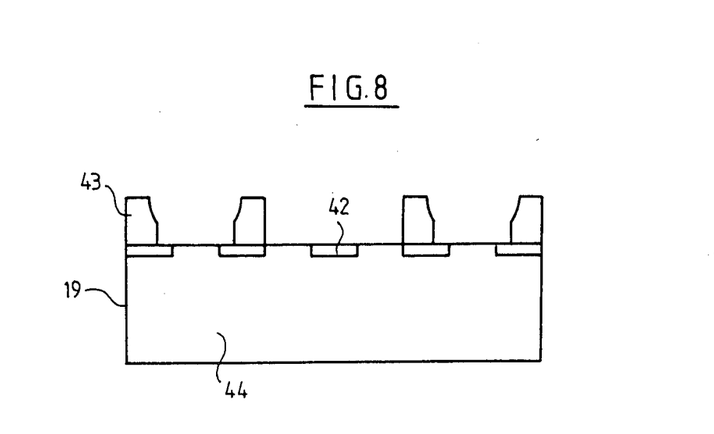

The holding means 19 can be (FIGS. 7 and 8) in the form of a support plate 42 of the tray type, comprising recesses so as to hold the product outwards and/or inwards. Preferably, the recesses 23 are profiled projections in the shape of the food product 1. The support plate 42 can comprise sides 44 having a height so as to allow the stacking of plates 42, while allowing the food product 1 to be housed therebetween.

The plant also comprises, where necessary, (first embodiment of the process) transverse cutting means (20) for the free front end part of the food product, which operate before the curving means 18 are themselves in operation.

On the one hand, the invention comprises drawing back means 21 for the free rear end portion 8 of the empty partially filled tubular envelope 2, which are operational before the curving means 18 are actuated: and on the other hand second drawing back means 22 for this free end portion 8, which are operative after the curving means 18 are actuated.

The curving means (FIG. 12) may comprise, for example, two gripping means 23a, 23b of the two free end portions of the food product 1 and relative entrainment means (not shown) of the two gripping means 23a, 23b between a first position where they are set apart from one another and a second position where they are close to one another, their function being to bring the two opposite free end portions 14a, 14b of the food product into contact with one another so to form the extension of one another.

Figure 12:
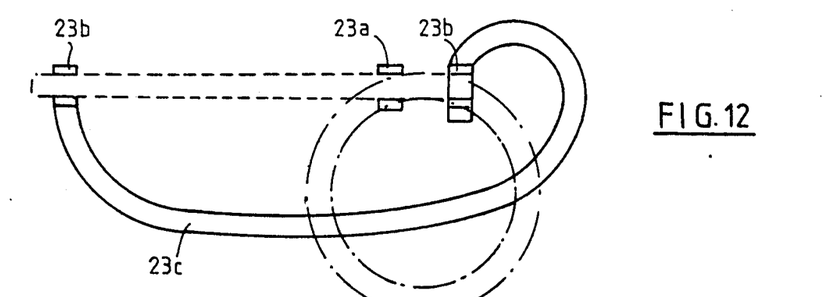
FIG. 12 is a diagrammatic view in section through an axial plane illustrating the curving means.

For example, the gripping means 23a are fixed and the gripping means 23b can be displaced along one loop by the entrainment means. The gripping means 23a, 23b can be in the form of clamps.

Figures 10, 11A, 11B, 11C:
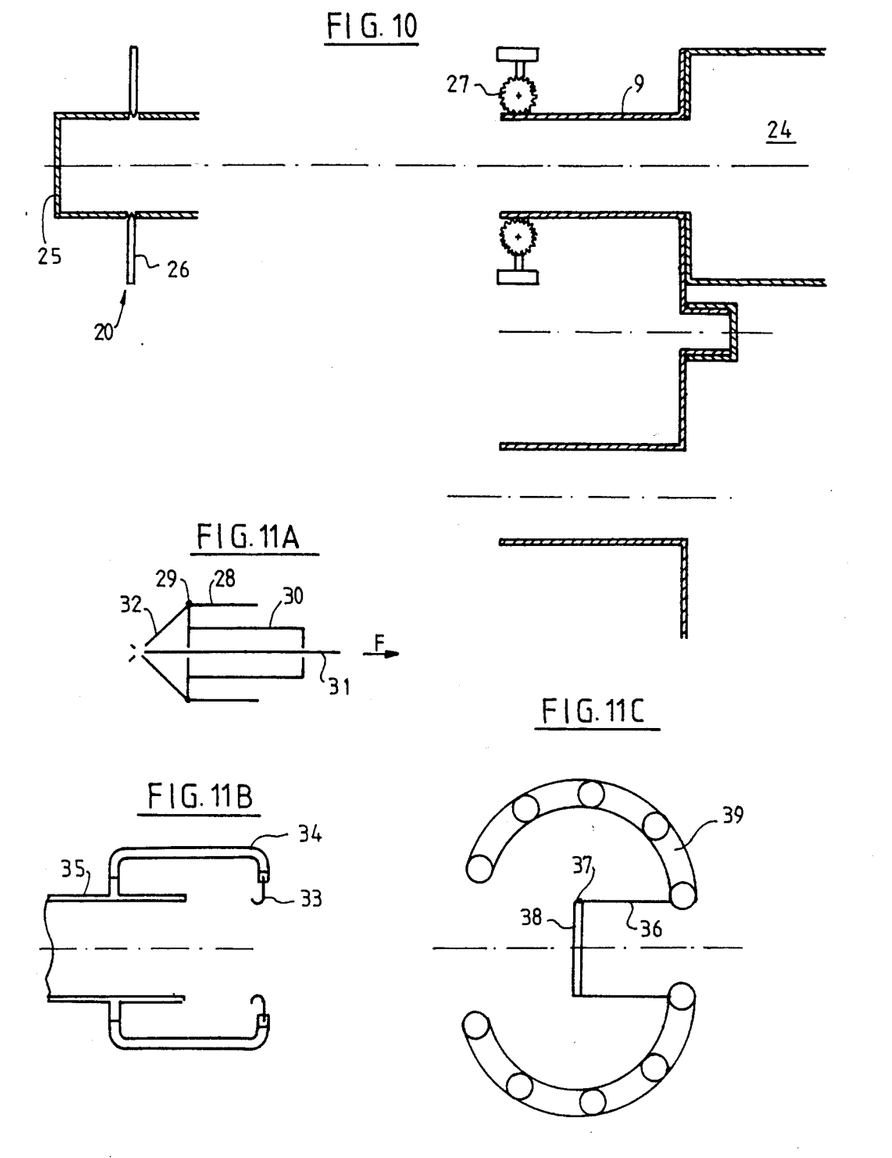
FIG. 10 is a diagrammatic view in section through an axial plane illustrating stuffing means and transverse cutting means.
FIGS. 11a, 11b and 11c are three diagrammatic views in section through an axial plane illustrating three different modifications of the first drawing back means.

A possible modification of the first filling station 17 and transverse cutting means 20 is shown in FIG. 10. The first filling station 17 comprises a joining piece or fixing member 9 being able to be brought into contact with a mixer 24 delivering the edible contents 3. A plurality of joining pieces such as 9 can be provided, forming a type of cylinder, one of the said pieces being in the operative phase. Opposite the main joining piece 9 which is spaced apart along the axis, an abutment 25 is disposed which forms the housing for the front end portion of the food product. Set back from the abutment 25, blades 26 are disposed which are displaced by entrainment means (not shown). Serrated wheels 27 or the like are associated with the joining piece 9 and grip the tubular envelope 2, thereby allowing the length of the tubular envelope 2 to be determined. Naturally, the tubular envelope 2 is stored on the joining piece 9 since it is filled via the mixer 24 until its front abuts against the abutment 25, which stops the supply and cause the transverse cut of the product as explained above. However, all that is required is for the front end of the tubular envelope 2 to be pinched to close it.

Different modifications of the first drawing back means 21 are shown in FIGS. 11a to 11c. The function of the said first drawing back means 21 is to draw back on itself, like a glove, the free rear end portion 8 of the envelope which is empty or only partly filled with edible contents 3. In a first modification (FIG. 11a), the first drawing back means 21 comprise rods 28 articulated in 29 on a frame 30 and a pull cord 31 associated with a return 32 integral with the rod 28. When the pull cord 31 is pulled in the direction of the arrow F, the rod 28 and the return 32 are made to pivot about the joint 29. This unit is disposed in the free rear end portion 8 of the tubular envelope, the rods 28 being pressed against against the inner face of the free rear end portion 8 of the tubular envelope 2.

In a second modification (FIG. 11b) the first return means comprise hooks 23 displaceably mounted along a guide path 34, the guide path comprising a first part which in movement moves away from the axis 13 of the envelope and a second part, which in motion is displaced parallel along the axis 13 towards a support 35 in which the food product is held on the side of its free rear end portion 8. Entrainment means (not shown) allow for the hooks 33 to be displaced along the guide paths 34.

In a third modification (FIG. 11c), the first drawing back means 21 comprise flaps 36 pivotably mounted about a joint 37 on a base plate 38. The free end portion of the hook 36 opposite the joint 37 is associated with entrainment means 39 such as a continuous chain. The said flaps 36 are to be arranged in the tubular envelope 2, so as to be disposed against the inner face of its free rear end portion 8.

Figure 13:
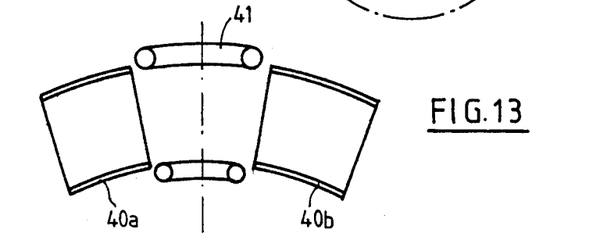
FIG. 13 is a diagrammatic view in partial section illustrating the second drawing back means.

The second means 22 can comprise (FIG. 13) two holding means 40a, 40b of the two free end portions of the product which are disposed opposite one another, but are, however, set apart from one another and, relative to one another, continuous friction entrainment belts 41 turning in the same direction so as to unfold gradually the free rear end 8 of the tubular envelope 2 which had been drawn back previously.

I claim:

1. A process for manufacturing toroid shaped food products, the process comprising the steps of:
   filling a food casing with a food base;
   leaving a portion of the casing unfilled at at least one end of the casing;
   exposing the food base at at least one end of the casing by involuting the unfilled portion of the casing;
   forming the casing into a toroid; and
   sealing the toroid by reversing the involution of the casing.

2. The process of claim 1, wherein one end of the casing is cut to expose the food base prior to forming the casing into a toroid.

3. The process of claim 1 wherein the casing is involuted by pulling the unfilled section back along the filled casing until the food base is exposed.

4. The process of claim 1 wherein the food base is minced meat.

5. A process for manufacturing toroid shaped sausages or salami-type food products, the process comprising the steps of:
   sealing one end of a tubular edible casing;
   extruding a sausage or salami type food base into the casing until the desired length of filled casing has been reached;
   trimming the unsealed end of the filled casing so that a short length of unfilled casing remains;
   folding the length of unfilled casing back along the filled section of the casing until the food base is exposed;
   cutting the sealed end of the casing so that the food base is exposed;
   bending the filled casing until the two ends abut against one another, thus forming a toroid;
   folding the unfilled casing back over the area where the two ends meet, thus sealing the seam between the two ends and preventing the toroid from breaking apart; and then
   cooking the toroid until the food base is set, 6. The process of claim 5, wherein the tubular casing has a circular cross-section.

7. The process of claim 5, wherein the tubular casing has an elloptical cross-section.

8. The process of claim 5 wherein the casing is selected from the grup of materials consisting of stuck together, reconstituted or synthetic materials.

9. The process of claim 5, wherein the food base is minced meat and is cooked by steaming.

10. The process of claim 5, wherein the food base is comprised of sausage meat.

* * * * *